No. 650,494. Patented May 29, 1900.
E. C. SOOY.
BALING PRESS.
(Application filed Aug. 5, 1899.)
(No Model.) 3 Sheets—Sheet 1.
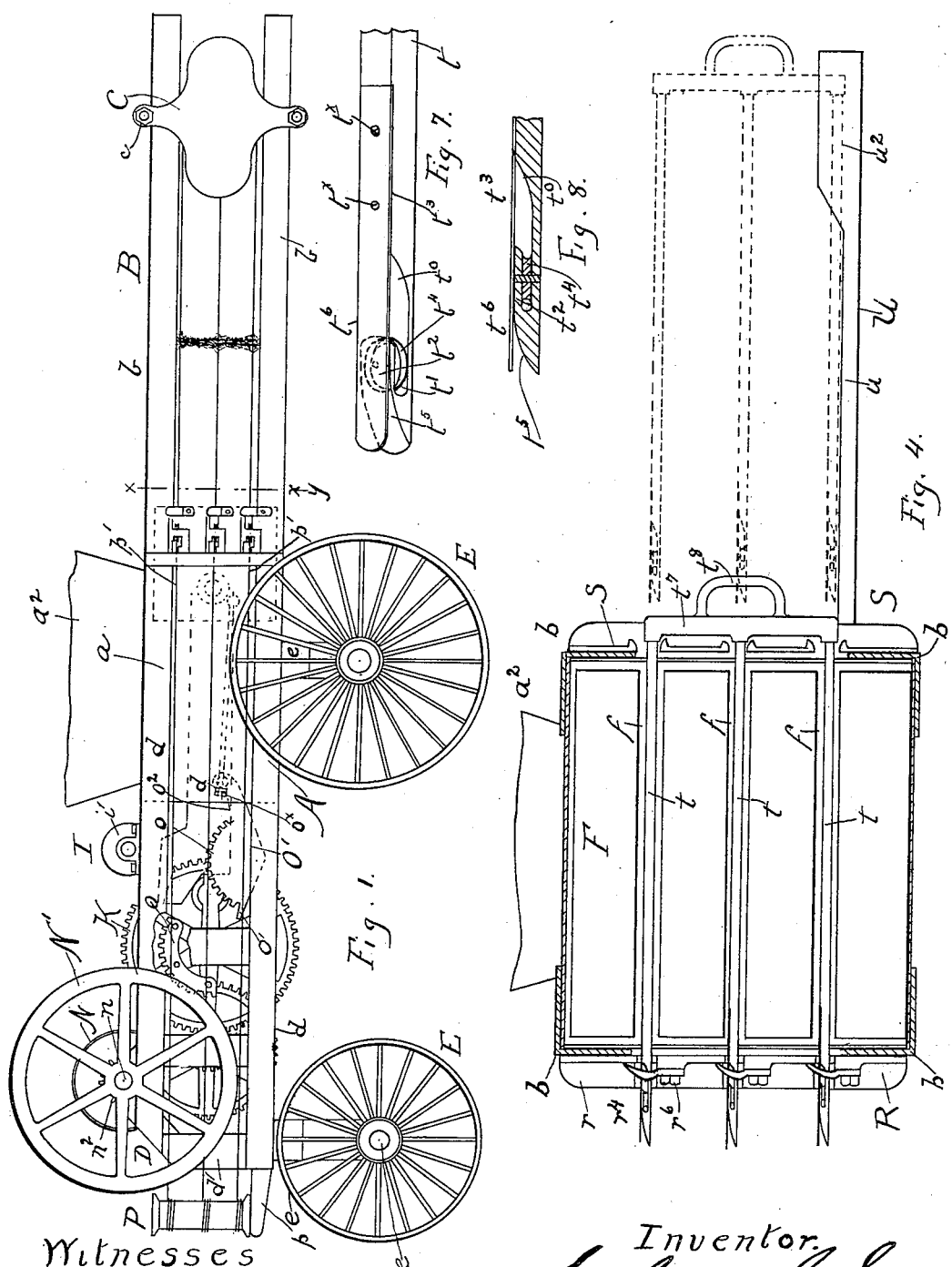

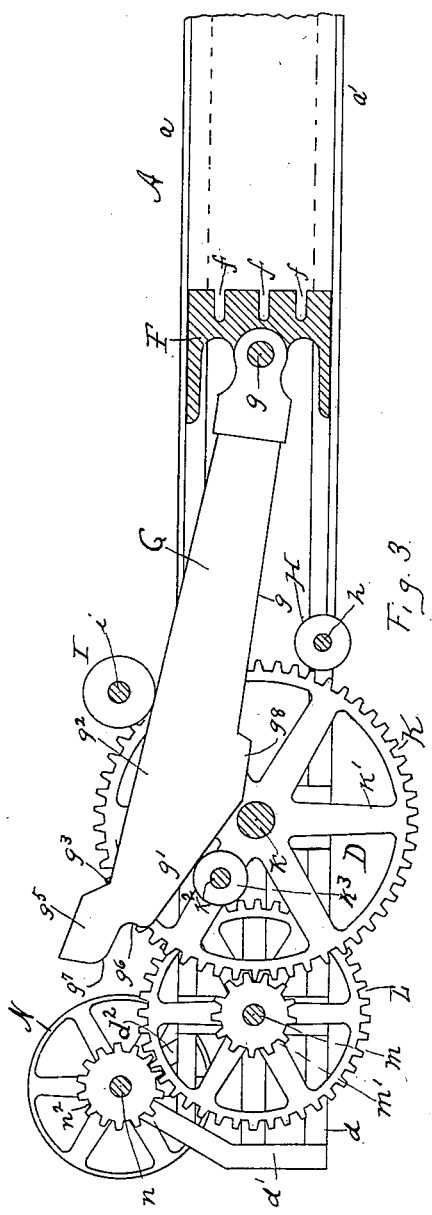
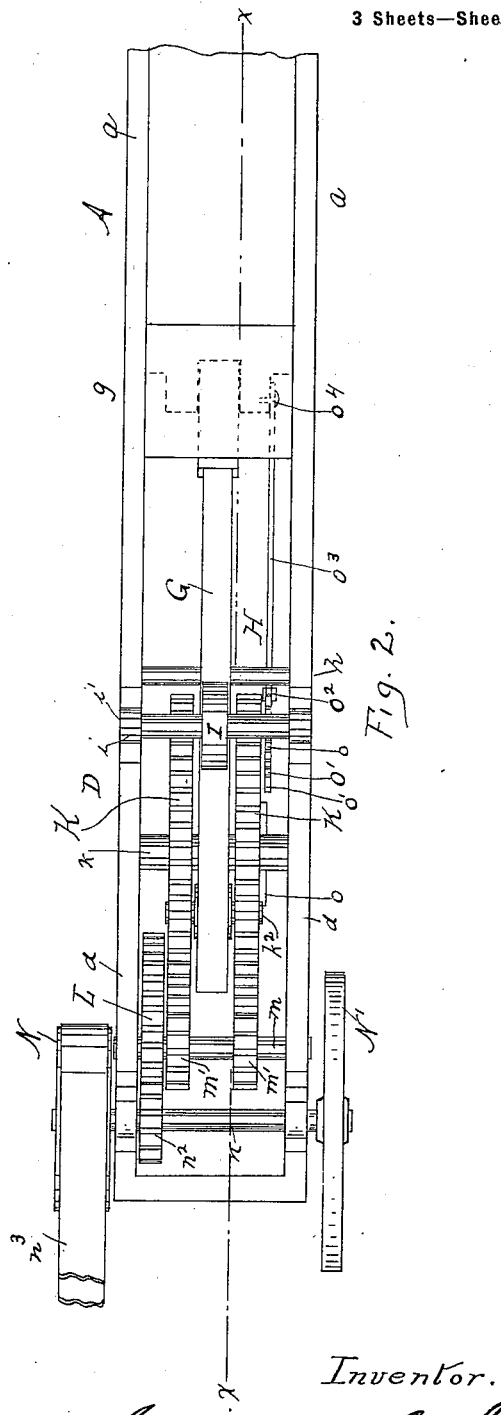

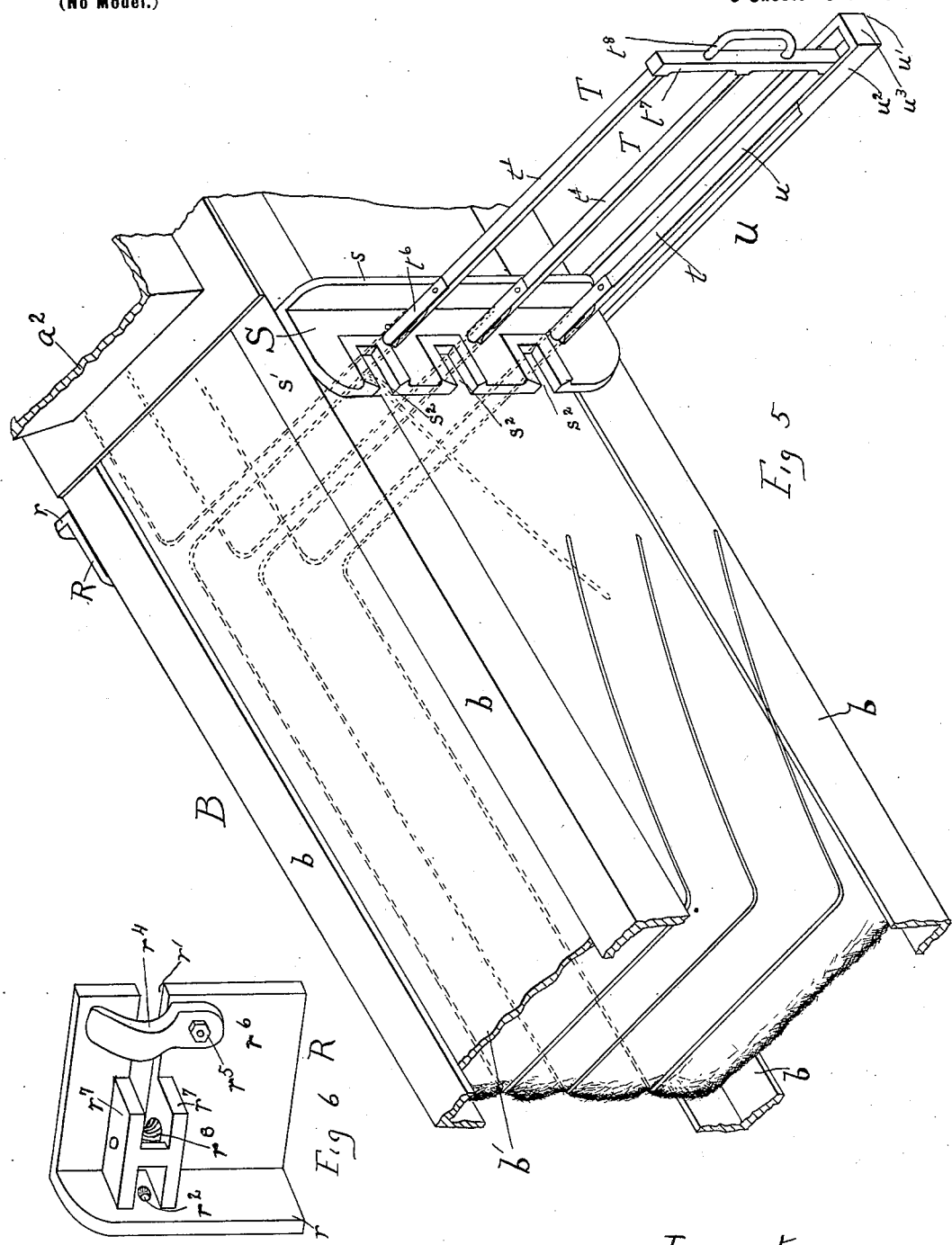

UNITED STATES PATENT OFFICE.

EPHRAIM C. SOOY, OF KANSAS CITY, MISSOURI.

BALING-PRESS.

SPECIFICATION forming part of Letters Patent No. 650,494, dated May 29, 1900.

Application filed August 5, 1899. Serial No. 726,336. (No model.)

*To all whom it may concern:*

Be it known that I, EPHRAIM C. SOOY, a citizen of the United States of America, residing at Kansas City, in the county of Jackson and State of Missouri, have invented certain new and useful Improvements in Baling-Presses; and I do hereby declare that the following is a full, clear, and exact description of the invention, such as will enable others to make and use the same, reference being had to the accompanying drawings, forming a part of this specification.

My invention has for its objects, first, to complete the full retraction automatically upon a failure of the plunger to rebound from the expansion of the baling material and during these intermittent periods of time; second, to impart a downward movement to the vibrating end of the pitman succeeding an initial forward movement imparted to the plunger; third, to pick up the baling-wires lying adjacent to and upon one side of the bale and draw them in the direction of the other side of the bale upon the completion of each bale in readiness to be tied; fourth, to prevent the accidental breaking of the guides for the baling-wires, and, fifth, to prevent the twisting or warping of the baling-wires drawn between the bales from continuous or endless wires.

My invention consists in the novel construction and combination of parts, such as will be first fully described, and specifically pointed out in the claims.

In the drawings, Figure 1 is a side view of the improved baling-press provided with the intermittent plunger-retracting device and the baling-wires and reel. Fig. 2 is a plan view of the forward end of the press, showing in detail the feed-chamber, plunger, the pitman, the power-conveying device to the pitman, and the intermittent plunger-retracting device. Fig. 3 is a sectional view taken upon the line X X of Fig. 2. Fig. 4 is a transverse sectional view through the baling-chamber of the press, taken upon the line $y\ y$ of Fig. 4. Fig. 5 is a broken view in perspective of the baling-chamber of the press and of the side of said chamber opposite to that seen in Fig. 1, showing the pick-up devices to the baling-wires. Fig. 6 is a broken portion of the plate on the side of the feed-chamber, showing the slot for the passage of the grappling-bar and baling-wires, the yielding guide, the guide-roller, and the outwardly-extended flange. Fig. 7 is a view in perspective of the end portion of the grappling-bar, showing the wire-grappling device. Fig. 8 is a sectional view of the wire-grappling devices.

Similar letters of reference indicate corresponding parts in all the figures of the drawings.

The general construction of the improved baling-press is such as to enable the application of increased power over that of the ordinary horse-power and to consequently increase the baling capacity.

In the drawings, to which reference is made, A represents the feed-chamber of the press, which consists of a receptacle for the material to be baled, having sides $a\ a$ and bottom $a'$ of the usual and well-known construction. Upon the top of the feed-receptacle is the ordinary hopper $a^2$ for the reception of the loose material to be baled.

B represents the baling-chamber, which is also of the well-known construction, consisting of the angle-bars $b\ b\ b\ b$, secured at one end to the respective rear end portions of the feed-chamber A and extending partially over the top and bottom and side portions of the said chamber and in the plane of said sides.

C represents the clamping-plates, and $c$ are the clamping-rods at the delivery end of the baling-chamber and extending around angle-bars $b\ b\ b\ b$, near their rear ends, and which are also of the usual construction.

$b'$ is the top plate to the baling-chamber B on the inner side of the angle-bars $b\ b$.

With the forward end of the feed-chamber A is connected the frame D, supporting the power-conveying devices to the pitman, and which consists of the upper and lower longitudinal side plates or beams $d\ d$, connected at their rear ends with the sides of said receptacle and extending forwardly a considerable distance in a horizontal line with the respective upper and lower edges of said feed-chamber. The longitudinal beams $d\ d$, between the said upper and lower beams, are of a corresponding length, supporting the driving-shafts herein described. The outer ends of the beams $d\ d$, on each side of frame D, are connected with upright tie-plates $d'$, the upper ends of which plates extend upwardly a considerable distance above the upper edge of the sides of frame D and are bent at an angle rearwardly to the lower ends, and with said ends is connected a supporting-plate $d^2$, also connected with the sides of frame D.

Upon the under side of the feed-receptacle A and the outer ends of the frame D are axles $e\ e$, with which are connected the wheels E E for the convenient transportation of the press.

In the feed-chamber A of the press is a plunger or head-block F of the usual dimensions, in the inner end of which block, toward the baling-chamber B, are transverse grooves $f\ f\ f$ of considerable depth. (See Figs. 3 and 4.)

With the outer end of the head-block is pivotally connected at $g$ one end of the pitman G, which is comparatively short in length and about one-third less than that of the supporting-frame D for the operating devices. A portion of the lower edge $g$ of the pitman extends from the pivotal point of connection of said plunger with the head-block F in the direction of and to within a short distance of the vibrating end in a straight line, and from said point the lower edge of said vibrating end is inclined upwardly and inwardly, as at $g'$, at an angle of inclination to the lower edge $g$. The upper edge $g^2$ of the pitman from its pivotal point with the head to its outer vibrating end extends in a straight line and parallel with the lower edge of said pitman. At the vibrating end of said pitman and upon the upper edge $g^2$ of said pitman is an outward extension $g^5$ of said pitman, the upper edge of which extension extends forwardly to the extreme contracted vibrating end of the pitman in a straight line, and at the rear end of said extension is an inclined shoulder $g^3$. At the end of the pitman, beneath the upwardly-extended portion $g^5$ and at the outer terminus of the inclined edge $g'$, is a shoulder $g^6$, extending a short distance in the transverse direction of said pitman, from the inner portion of which shoulder the lower edge portion $g^7$ of the extreme vibrating end of the pitman extends forwardly the same distance as the extension $g^5$ and is curved at the outer extremity of said edge portion and in the direction of said extension $g^5$. Upon the lower edge $g$ of the pitman and adjacent to the inclined portion $g'$ is a downward extension or block $g^8$, the forward end of which block is inclined in the same plane as the inclined surface $g'$, and the under side portion of which block is in a straight line and parallel with the lower edge $g$ of the pitman.

H is the lower guide-roller for the pitman, the journals $h$ of which roller extend through the sides of the lower side beams $d\ d$ of the frame D at a point on said beams a short distance from the feed-chamber A and in the path of the lower edge of the downward extension or block $g^8$ on the lower edge of said pitman.

I is the upper guide-roller, the journals of which roller are supported in the journal-boxes $i\ i$ on the upper edge of the upper side beams $d\ d$ of the frame D, which are in position a short distance from a vertical line extending through the journal-bearings for the roller H in the direction of the forward end of said frame.

$k$ is a power-shaft which is journaled in the vertical side beams $d\ d$ of frame D, which are connected with the upper and lower beams of said frame and at a point upon said beams about two-thirds the distance from the feed-chamber A to the forward end of the frame D and in the path of the inclined lower edge $g'$ of the pitman G. Upon said shaft $k$ are the gear-wheels K K, arranged a short distance apart and having radial arms $k'\ k'$, and between which wheels is extended the vibrating end of the pitman G. With the arms $k'\ k'$ of the gear-wheels K K opposite in position is connected a wrist-pin $k^2$, upon which pin, between said wheels, is an antifriction-roller $k^3$. Upon the same side beams of frame D upon which the shaft $k$ is journaled and between said shaft and the forward end of frame D is journaled a shaft $m$, upon which shaft is a large gear-wheel L and the small gear $m'\ m'$, with which engage the gear-wheels K K on shaft $k$. Upon the upper ends of the vertical end plates $d'\ d'$ at the forward end of frame D and the supports $d^2$, before described, is journaled a shaft $n$, extending beyond the sides of frame D, upon one end of which shaft is a band-wheel N, and upon the other end of said shaft is a balance-wheel N'. Upon the shaft $n$, on the inner side of frame D, is a gear $n^2$, with which engages the gear-wheel L. Over the band-wheel N extends one end of a belt $n^3$, (see Fig. 3,) the other end of which belt is extended over the band-wheel of an engine (not shown) and the ends of the belt connected together in the usual manner.

Upon the outer side of the guide-wheels K is secured a semicircular toothed sector or plate O, and upon the inner side of the frame D and the lower beam $d$ of said frame is pivotally connected a semicircular sector or plate O', having teeth $o$, on one end of which plate is a tooth $o'$, extending beyond the curved line of the outer ends of teeth $o$. Upon the other side of the sector or plate O extends an arm $o^2$, which is perforated at $o^6$ to receive one end of a rod $o^3$, upon the end of which rod is a head $o^x$, the other end of which rod is pivotally connected at $o^4$ to the end of pivot $g$, connecting the pitman G with the head-block. Upon the forward end of frame D and upon the side of said frame having sectors O O' is an arm $p$, the outer end of which arm is bent upwardly and upon which is pivotally supported a spool P, upon which spool is the baling-wires and from which spool extends the wires or strands $p'\ p'$. Upon the corresponding side of the press and connected with the outer side portion of the side bars $b\ b$ is a vertically-arranged flat plate R, upon the rear vertical edge portion of which plate is a guide-strip, extending outwardly at right angles to said plate. In the plates R are slots $r'\ r'\ r'$, which extend from the front edge of plate R rearwardly to the plate $r$, are in line horizontally with the grooves $f\ f\ f$ in the inner end of the pitman F, and correspond in width to the width of said slots. In the plate $r$ are transverse perforations $r^2$, also in the same horizontal plane as the slots $r'$ in the plate R. Near the outer edge of the plate R and directly beneath the slots $r'$ are pivotally connected the yielding wire-guides $r^4$, each of which consists of a flat plate narrow in width, the lower end of which plate is connected with the plate R by the bolts $r^5$ and nuts $r^6$. The upper end of guide $r^4$ is bent outwardly and nearly at right angles at a point opposite the slot $r'$ and thence extended upwardly past the upper edge of said slot. Upon the side of plate R, above and below each slot $r'$, are cast the horizontal lugs $r^7\ r^7$, which extend to the plate $r$, and between which lugs is a grooved roller $r^8$, the journals of which extend within said lugs. Upon the other side of the baling-chamber B and secured to the side bars $b\ b$ in a vertical position is a plate S, which is opposite in position to the plate R. Upon the forward end of plate S is a narrow plate $s$, extending outwardly and at right angles thereto. The rear edge $s$ of said plate is bent outwardly a short distance in an outwardly-curved line. In plate S are slots $s^2\ s^2\ s^2$, extending horizontally in line with the slots $f$ in the head-block F and also with the slots $r'$ in the plate R and from the rear edge $s'$ in the direction of the plate S a little more than one-half the distance to said plate S and correspond in width to that of the slot $r'$ in the plate R. The outer edges of the sides and end of slots $s^2$ are beveled or inclined from said outer edge inwardly in the direction of the inner edge of said slots.

T T T represent the improved self wire-threading or pickup grappling-bars within the slots $s^2\ s^2\ s^2$ of the plate S and extending through the baling-chamber B and through the slots $r'$ in the plates R and a short distance beyond the outer surfaces of said plates and between the grooved roller $r^8$ and the guide $r^4$. Each grappling-bar T consists of a longitudinal bar $t$, in the outer end of which bar is a slot $t'$, extending from a point near the forward end of said bar a short distance longitudinally in the direction of the rear end of said bar. The upper side $t^2$ of the slot consists of a thin plate extending rearwardly about two-thirds the length of the slot $t'$, and between the rear end of said plate and the rear end of the slot $t'$ is an opening or eye $t^3$ for the reception of the wire, the rear end $t^0$ of which slot $t^3$ extends upwardly and forms the rear side of the opening $t^3$ and is inclined rearwardly at an angle of inclination to the said bar. In the slot $t'$ is an antifriction-roller $t^4$, which is pivoted in the plate $t^2$ and the portion of said bar in the slot $t'$ beneath said roller. The upper surface of the extreme forward end of the bar from the plate $t^2$ extends downwardly to the plane of the under side of said needle-bar in an outwardly-curved line, as at $t^5$. Upon the upper surface of the bar $t$ is a flat yielding spring-plate $t^6$, the rear end of which spring-plate is secured to the bar $t$ by the pins $t^x$, and the forward end of the said plate extends over and covers the opening $t^3$ and to a position opposite the outer end of the bar $t$ and above the curved upper surface $t^5$ of said bar. The bars $t\ t\ t$ at their inner ends are connected in series with one side of a vertical bar $t^7$. Upon the other side of said bar is a handle $t^8$.

Upon the side of the baling-chamber B having plate S and connected with the said plate at one end is a laterally-extended beam U, the upper surface $u$ of which is in line horizontally with the lower edge of the slot $s^2$ lowest in position in the plate S, upon which the bar $t^7$ and the needle-bar $t$ lowest in position upon said bar are adapted to be reciprocated. Upon one side of the beam U, extending toward the angle-plate S, is a guide-plate $u'$, extending a short distance above the plane of the upper surface of said beam. Upon the other side of the beam to that having the guide $u'$ and at the outward end of said beam is an upwardly-extended guide-plate $u^2$, which extends a short distance in the direction of the baling-chamber B, and connecting the said guide-plates at the extreme outer end of the beam U is a stop-plate $u^3$.

In the operation of the improved press, power is communicated from the engine or source of power through the belt $n^3$ to the band-pulley N, thence through gear $n^2\ n^2$ on said shaft to the large gear L on shaft $m$, and thence through the small gear $m'\ m'$ on said shaft to the large gear-wheels K K, and the power, increased at a reduced degree of speed to that of the engine, is communicated to the said gear-wheels, the regularity of the movement being also maintained by the balance-wheel N'. The material to be baled is placed loosely in the hopper $a^3$ and passes within the feed-chamber A and upon the retraction of the head-block fills in the space between the said head-block and the entrance to the baling-chamber. The repeated charges of the loose material inserted in the path of the head-block are forced rearwardly within the baling-chamber, and the compression of the material by the head-block is followed by instant expansion, causing the head-block to rebound with a great degree of force, and also the pitman G, and the inclined lower edge $g'$ of said pitman is brought into contact with the shaft $k$, and the vibrating end of said pitman is raised from its position, as seen in Fig. 1, with the lower edge of the extension $g^8$ resting upon the roller H, into the position as seen in Fig. 3. Upon the rotation of the gear-wheels K K the roller $k^2$ on the wrist-pin comes into contact with the said inclined edge $g'$, and the upward movement of said pitman being counteracted by the roller I, which acts as a guide to said pitman, an initial rearward movement of the pitman and plunger is caused by the power applied to said inclined edge by the roller $k^2$, and as the head-block F moves forward the vibrating end of the pitman moves downward to a position in which the shoulder $g^6$ and the roller $k^2$ come into contact, and at the same time the curved rear end portion $g^8$ of the extension $g^5$ comes into contact with the roller I. In the next quarter of a circle of rotation the roller $k^2$ forces the pitman rearwardly, and also the head-block F within the feed-chamber A, the roller I passing from the curved rear edge of the extension $g^5$ to a position in contact with the upper edge of said extension and preventing the upward movement of the vibrating end of the pitman, the head-block forcing the loose material in the feed-chamber within the baling-chamber and compressing the same. In the next quarter of a circle of rotation the roller I passes from the shoulder $g^6$ and the pitman and head-block rebound into the position as seen in Fig. 3, the operation being repeated.

In order to provide for a contingency in which the expansion of the material may not be sufficient to cause the rebound of the head-block to the full extent, so as to enable the roller $k^2$ to effect a full stroke of the pitman, and which will occur before the accumulation of material is sufficient to exert an expansive force, the end of the sector-plate O in the rotation of the gear-wheels K K comes into contact with the prolonged tooth $o'$ and moves the side of the sector-plate downward, thus causing the teeth upon both plates O O' to mesh, and the forward end of said plate is moved downwardly in the arc of a circle. The other end of the plate is elevated in position which operates the rod $o^3$ and retracts the head-block or plunger F in the feed-chamber, and the pitman is also moved rearwardly into the position as in Fig. 3, so as to be operated by the roller $k^2$ on the crank-wrist of the gear-wheels K K. Upon the completion of the movement by the meshing gear-sectors the plate O' moves back into the position as seen in Fig. 1 upon the forward movement of the head-block, and a reciprocating movement imparted to rod $o^3$ from said head-block causes a uniform oscillation of the sector-plate upon the rebound of the head-block, thus throwing the toothed extension $o'$ out of the path of rotation of the sector-plate $o$, it being observed that the position of the sector-plate upon the gear-wheel K is upon radial bars of the wheel, while when the crank-wrist is in a horizontal position and its roller $k^3$ in alinement with the pitman the said sector-plate is in a plane above a horizontal line extending in the direction of the length of the press and through the said crank-wrist and shaft $k^2$ and upon the radial bar in rear of said bar having the crank-wrist $k^2$. Sufficient material having been compressed in the baling-chamber B to form a bale, the free ends of the baling-wires $p\ p\ p$ are extended to the angle-plate $r$ on the plate R on the side of the baling-chamber B, thence through the perforations $r^2$ in plate $r$, and thence along and parallel with the side of the bale and around the outer end of said bale. In the formation of the first bale in the press the ends of the wires are extended around the outer end of the bale to a position about one-half the distance from said outer end of the bale to the baling-chamber. Upon the completion of the full stroke of the head-block F to add the quantity of material desired to complete the bale and during the interval of time in which the head-block is in contact with the bale, which in this press is quite brief, the wire-grappling bars being in the position in dotted lines, Fig. 5, handle $t^8$ on the initial bar $t^7$ is seized by the hand and moved rapidly on the beam U in the direction of the baling-chamber and the grappling-bars $t\ t\ t$ thrust within the slots $s^2\ s^2\ s^2$ in the plate S and within the slots $f\ f\ f$ in the head-block, which serve as guides to the grappling-block, and thence through the slots $r'\ r'\ r'$ in the plate R and between the roller $r^8$ and the guide $r^4$, the ends of the grappling-bars receiving the baling-wires between the outer end of the spring-plate $t^6$ and the upper curved surface of the grappling-bar, and guided upwardly upon said surface passes over the upper surface of the plate $t^2$ to the eye or opening $t^3$, thence falls within the said opening and in rear of the antifriction-roller $t^4$. The baling-wires having been seized by the grappling-bars, the vertical bar $t^7$ is drawn rapidly away from the side of the baling-chamber toward the outer end of the beam U until the movement of the said bar is checked by the stop $u^3$ at the outer end of said beam, the needle-bars $t\ t\ t$ simultaneously drawing upon the baling-wires, which are pushed out from the rod P, and forming loops in said wires, which loops are drawn through the slots $r'$ in the plate R and the slots $s^2$ in the plate S, the antifriction-roller in the eye of the needle serving to prevent friction upon the wires and also enabling the gradual increase in length of the loops, which loops are drawn a sufficient distance from the bale, and the loop is cut or separated, thus releasing the needle-bar and leaving free ends of the wires to be extended toward the ends of the wires extending around the outer end of the bale, which free ends are tied together in the usual manner. The other free ends of the wires from the loop are retained in position until another bale has been formed, when the operations of thrusting the needles through the slots in the plates S and R are repeated, and in the formation of subsequent bales the loops are cut as before described, leaving the free ends to be tied and others held in place for the meeting ends of the respective lengths cut from the loops in the endless wires. In this manner the rapid tying of the bales is effected without the employment of division-blocks and by a single person. In the formation of the loops in the baling-wire described the portion of the wire toward the bale passes over the guide $r^4$.

In case the action of the head-block in compressing the material in the baling-chamber should make a full stroke after the completion of the bale and the inner end of said head-block should accidentally strike the baling-wires when under tension, the upper ends of the guides $r^4$ move rearwardly and downwardly on the pivots $r^5$, thus preventing the breaking of said plate and the accidental cutting of the baling-wires, which might occur if the guide $r^4$ was rigidly connected with the plate R. The guides $r^4$ are returned to their normal or vertical position by the releasing of the nut $r^6$ on the pivot or bolt $r^5$, upon the completion of which movement the nuts are turned upon the bolts so as to bind the said plates upon the plate R.

It is obvious that changes in construction may be made within the scope of the invention.

Having fully described my invention, what I now claim as new, and desire to secure by Letters Patent, is—

1. In a baling-press, the combination with the frame of the press, of a rotatable power-shaft having crank-arms, a rebounding plunger and a pitman having its vibrating end adapted to come into contact with the ends of said crank-arms, toothed sector-plates in different planes upon the said power-shaft and the frame of the press adapted to mesh intermittently with each other, one of said gear sector-plates having a tooth extended beyond the line of the other teeth in said plates, and power connecting devices connected with said side plate and said plunger.

2. In a baling-press, the combination with the frame of said press of a rotatable power-shaft having crank-arms, a rebounding plunger and a pitman having a contracted inclined vibrating end portion adapted to come into contact with said crank-arms, a toothed sector-plate on the crank-arms of the power-shaft, and a toothed sector-plate pivotally connected with the frame of said press in different planes and adapted to mesh intermittently, said sector-plate in said frame having one tooth at one end of said plate extending beyond the plane of the other teeth and a rod pivotally connected with the other end of said plate and also with the plunger.

3. A needle-bar having an inclined surface at one end, and an eye in said end, and an opening in the side of said bar leading to said eye, and a spring-plate connected with said bar and extending to a position above the end of said bar, having the inclined surface and also past the said opening to the eye.

4. A needle-bar having an inclined surface at one end and an eye in said end and an opening in the side of said bar leading to said eye a pivoted antifriction-roller within said eye and a spring-plate connected with said bar and extending to a position above the end of said bar having the inclined surface and also past the said opening to the eye.

5. In loop-forming devices for baling-wires, a slotted plate, a pivoted guide-roller in the slot of said plate, and a guide opposite in position to the said roller, and a bar having a wire-grappling device in one end thereof, adapted to play between said roller and said guide.

6. In combination with a baling-press of plates upon the sides thereof having longitudinal slots therein of pivoted guide-rollers mounted in said slots and yielding guides spaced apart from said rollers and needle-bars having wire-grappling devices in the ends thereof adapted to play in the slot between said rollers and said guides.

EPHRAIM C. SOOY.

Witnesses:
T. C. SPARKS,
JOHN T. MARSHALL.